US010444102B2

(12) United States Patent
Herbsommer et al.

(10) Patent No.: US 10,444,102 B2
(45) Date of Patent: Oct. 15, 2019

(54) PRESSURE MEASUREMENT BASED ON ELECTROMAGNETIC SIGNAL OUTPUT OF A CAVITY

(71) Applicant: TEXAS INSTRUMENTS INCORPORATED, Dallas, TX (US)

(72) Inventors: Juan Alejandro Herbsommer, Allen, TX (US); Adam Joseph Fruehling, Garland, TX (US); Swaminathan Sankaran, Allen, TX (US); Benjamin Stassen Cook, Addison, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 161 days.

(21) Appl. No.: 15/698,528

(22) Filed: Sep. 7, 2017

(65) Prior Publication Data

US 2019/0072448 A1    Mar. 7, 2019

(51) Int. Cl.
*G01L 11/00* (2006.01)
*G01L 11/02* (2006.01)

(52) U.S. Cl.
CPC .................................. *G01L 11/00* (2013.01)

(58) Field of Classification Search
CPC ............. G01F 5/14; G01L 11/00; G01L 11/02
See application file for complete search history.

(56) References Cited

U.S. PATENT DOCUMENTS

| 4,147,431 A * | 4/1979 | Mann ...................... G01L 11/02 250/458.1 |
| 4,826,616 A | 5/1989 | Tanino |
| 5,107,231 A | 4/1992 | Knox |
| 5,198,786 A | 3/1993 | Russell et al. |
| 5,218,373 A | 6/1993 | Heckaman et al. |
| 5,412,186 A | 5/1995 | Gale |
| 5,459,324 A * | 10/1995 | Fima ...................... G01K 11/20 250/338.5 |
| 5,821,836 A | 10/1998 | Katehi et al. |
| 6,131,256 A | 10/2000 | Dydyk et al. |
| 6,236,366 B1 | 5/2001 | Yamamoto et al. |
| 6,362,706 B1 | 3/2002 | Song et al. |
| 6,498,550 B1 | 12/2002 | Miller et al. |
| 6,630,359 B1 | 10/2003 | Caillat et al. |
| 6,670,866 B2 | 12/2003 | Ella et al. |
| 6,842,088 B2 | 1/2005 | Yamada et al. |

(Continued)

FOREIGN PATENT DOCUMENTS

| JP | 6428974 | 1/1989 |
| WO | 2014037016 | 3/2014 |
| WO | 2016161215 | 10/2016 |

OTHER PUBLICATIONS

International Search Report for PCT/US2018/050253 dated Jan. 10, 2019.

(Continued)

*Primary Examiner* — Nguyen Q. Ha
(74) *Attorney, Agent, or Firm* — Michael A. Davis, Jr.; Charles A. Brill; Frank D. Cimino

(57) ABSTRACT

A pressure transducer includes a cavity, dipolar molecules disposed within the cavity, and pressure measurement circuitry. The pressure measurement circuitry is configured to measure a width of an absorption peak of the dipolar molecules, and to determine a value of pressure in the cavity based on the width of the absorption peak.

20 Claims, 4 Drawing Sheets

(56) References Cited

U.S. PATENT DOCUMENTS

| | | |
|---|---|---|
| 6,989,723 B2 | 1/2006 | Komuro et al. |
| 6,998,691 B2 | 2/2006 | Baugh |
| 7,388,454 B2 | 6/2008 | Ruby et al. |
| 7,408,428 B2 | 8/2008 | Larson, III |
| 8,098,208 B2 | 1/2012 | Ficker et al. |
| 8,268,642 B2 | 9/2012 | Yoshitomi et al. |
| 8,293,661 B2 | 10/2012 | Yamazaki |
| 8,586,178 B2 | 11/2013 | Schwanke et al. |
| 9,436,902 B1 | 9/2016 | Koepp et al. |
| 9,529,334 B2 | 12/2016 | Herbsommer et al. |
| 9,735,754 B2 | 8/2017 | Shin et al. |
| 2002/0038989 A1 | 4/2002 | Larson, III |
| 2002/0068018 A1 | 6/2002 | Pepper et al. |
| 2002/0098611 A1 | 7/2002 | Chang et al. |
| 2003/0015707 A1 | 1/2003 | Bosco et al. |
| 2003/0048500 A1 | 3/2003 | Fala et al. |
| 2003/0107459 A1 | 6/2003 | Takahashi et al. |
| 2004/0142484 A1 | 7/2004 | Berlin et al. |
| 2004/0166577 A1 | 8/2004 | Storek et al. |
| 2005/0023932 A1 | 2/2005 | Inoue et al. |
| 2006/0022761 A1 | 2/2006 | Abeles |
| 2006/0076632 A1 | 4/2006 | Palmateer et al. |
| 2006/0144150 A1* | 7/2006 | Wu .................. G01L 11/02 73/705 |
| 2007/0189359 A1* | 8/2007 | Chen .................. B82Y 30/00 374/161 |
| 2008/0319285 A1 | 12/2008 | Hancock |
| 2010/0182102 A1 | 7/2010 | Kuypers et al. |
| 2010/0259334 A1 | 10/2010 | Briggs |
| 2010/0327701 A1 | 12/2010 | Grannen et al. |
| 2011/0140971 A1 | 6/2011 | Schwanke et al. |
| 2012/0266681 A1* | 10/2012 | Baumann ............ G01L 11/02 73/705 |
| 2013/0176703 A1 | 7/2013 | Hopper et al. |
| 2014/0155295 A1 | 6/2014 | Hindson et al. |
| 2014/0210835 A1 | 7/2014 | Hong et al. |
| 2014/0347074 A1 | 11/2014 | Nadeau |
| 2014/0368376 A1 | 12/2014 | Nadeau et al. |
| 2014/0368377 A1 | 12/2014 | Nadeau et al. |
| 2014/0373599 A1 | 12/2014 | Trombley et al. |
| 2015/0144297 A1* | 5/2015 | Toivonen ............ G01L 11/02 165/11.1 |
| 2015/0123748 A1 | 7/2015 | Stevenson |
| 2015/0277386 A1 | 10/2015 | Passilly et al. |
| 2016/0091663 A1 | 3/2016 | Taylor |
| 2016/0233178 A1 | 8/2016 | Lamy et al. |
| 2017/0073223 A1 | 3/2017 | Nasiri et al. |
| 2017/0125660 A1 | 5/2017 | Stephanou et al. |
| 2017/0130102 A1 | 5/2017 | Campbell et al. |
| 2018/0159547 A1 | 6/2018 | Herbsommer et al. |

OTHER PUBLICATIONS

Alvarez, A.L. et al; "The Application of Microencapsulation Techniques in the Treatment of Endodontic and Periodontal Diseases" Pharmaceutics; 2011 abstract p. 540-548.

Steinberg, D. et al; "A New Degradable Controlled Release Device for Treatment of Periodontal Disease: In Vitro Release Study"; J. Periodontology; 1990; p. 393 lines 1-17; p. 394 col. 1 lines 5-14.

Xiong, R. et al.; "Towards Theranostic Multicompartment Microcapsules: in situ Diagnostics and Laser-induced Treatment", Theranostics; 2013; pp. 145-149.

International Search Report for PCT/US2018/049513 dated Nov. 15, 2018.

International Search Report for PCT/US2018/049940 dated Dec. 13, 2018.

International Search Report for PCT/US2018/049949 dated Dec. 13, 2018.

International Search Report for PCT/US2018/049949 dated Dec. 27, 2018.

International Search Report for PCT/US2018/047105 dated Dec. 27, 2018.

* cited by examiner

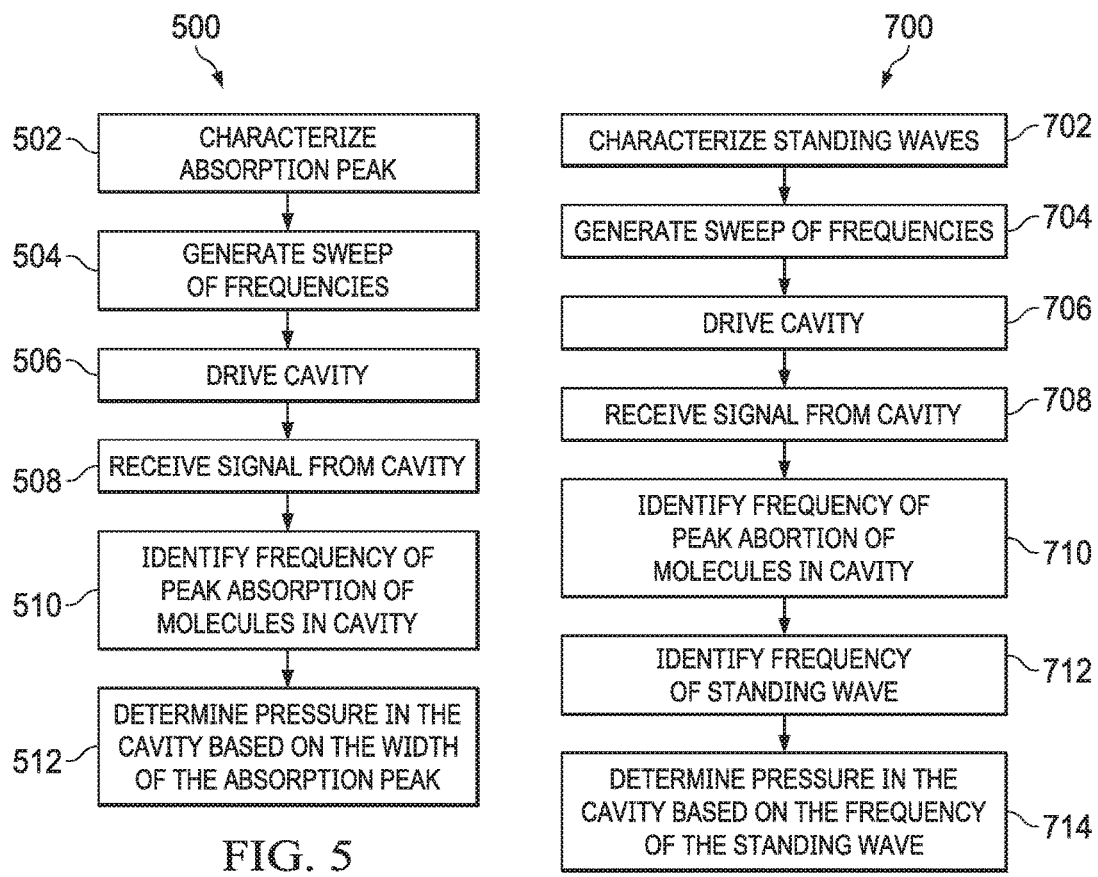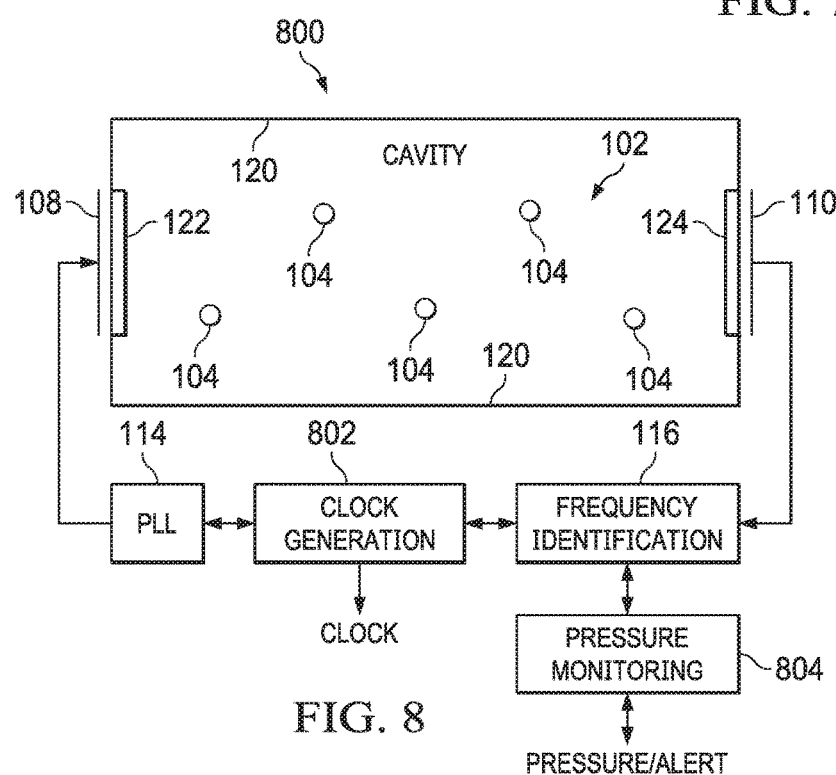

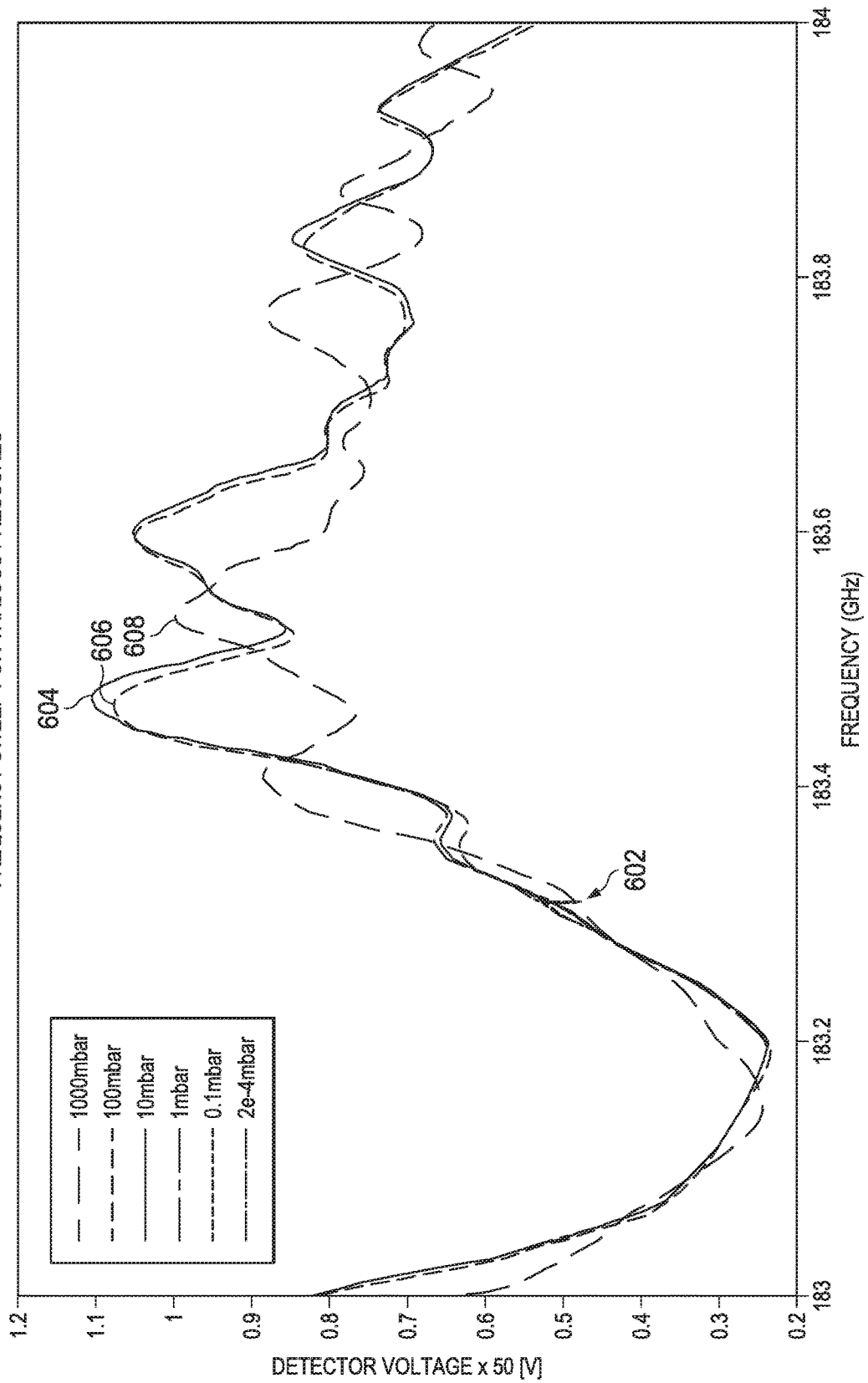

PRESSURE MEASUREMENT BASED ON ELECTROMAGNETIC SIGNAL OUTPUT OF A CAVITY

BACKGROUND

Various applications require that the integrity of sealed chamber be maintained to insure proper equipment operation. For example, for a housing intended to maintain a low internal pressure, a leak in the housing may allow ingress of fluid that dilutes or contaminates the contents of the housing to the extent that housing contents are no longer useable for the intended purpose. In one particular application, the waveguide of a chip-scale atomic clock contains a selected vapor and requires that a proper seal be maintained to insure the pressure of the vapor and proper operation of the clock.

SUMMARY

Apparatus and method for measuring pressure of sealed cavity are disclosed herein. In one embodiment, a pressure transducer includes a cavity, dipolar molecules disposed within the cavity, and pressure measurement circuitry. The pressure measurement circuitry is configured to measure a width of an absorption peak of the dipolar molecules, and to determine a value of pressure in the cavity based on the width of the absorption peak.

In another embodiment, a method for measuring pressure in a cavity includes transmitting a signal into the cavity. The cavity contains dipolar molecules. A width of an absorption peak of the dipolar molecules is measured. A value of pressure in the cavity is determined based on the width of the absorption peak.

In a further embodiment, a pressure transducer includes a cavity, dipolar molecules, and pressure measurement circuitry. The dipolar molecules are disposed within the cavity. The pressure measurement circuitry is configured to identify a frequency of a standing wave in the cavity. The pressure measurement circuitry is configured to determine a value of pressure in the cavity based on the frequency of the standing wave.

In a yet further embodiment, a clock generator includes a hermetically sealed cavity, clock generation circuitry, and pressure monitoring circuitry. The hermetically sealed cavity is formed in a silicon substrate and contains dipolar molecules. The clock generation circuitry is configured to generate an output clock signal at a frequency of an absorption peak of the dipolar molecules. The pressure monitoring circuitry is configured to determine a value of pressure in the cavity based on the absorption peak of the dipolar molecules. The absorption peak is at a frequency of quantum rotational state transition of the dipolar molecules.

Some embodiments of the clock generator are configured to measure a width of the absorption peak of the dipolar molecules, and to determine the value of pressure in the cavity based on the width of the absorption peak.

Some embodiments of the clock generator include a first antenna coupled to the cavity and a second antenna coupled to the cavity. The first antenna is configured to transmit signal into the cavity. The second antenna is configured to receive signal from the cavity. The pressure monitoring circuitry is coupled to the second antenna. The pressure monitoring circuitry is configured to determine a range of frequencies corresponding to the absorption peak.

Some embodiments of the clock generator include a phase-locked loop (PLL) and frequency identification circuitry. The PLL is configured to sweep a range of frequencies comprising the absorption peak. The frequency identification circuitry is configured to determine amplitude of signal detected by the second antenna at a plurality of frequencies based on the frequencies swept by the PLL.

Some embodiments of the clock generator are configured to identify a frequency of a standing wave at an output of the cavity, and to determine a value of pressure in the cavity based on the frequency of the standing wave. The frequency of the standing wave is higher than the frequency of an absorption peak of the dipolar molecules. The frequency of the standing wave is detected as maximum signal amplitude higher in frequency than the absorption peak.

BRIEF DESCRIPTION OF THE DRAWINGS

For a detailed description of various examples, reference will now be made to the accompanying drawings in which:

FIG. 5 shows a flow diagram for a method for measuring pressure based on the width of the absorption peak of a dipolar molecule in accordance with various embodiments;

FIG. 6 shows signal output of a sealed cavity in which the frequency of a standing wave changes with various pressure in the cavity in accordance with various embodiments;

FIG. 7 shows a flow diagram for a method for measuring pressure based on the frequency of a standing wave in a sealed cavity in accordance with various embodiments; and FIG. 8 shows a block diagram for a clock generator that includes pressure measurement based on the width of the absorption peak of a dipolar molecule and/or frequency of a standing wave in a sealed cavity in accordance with various embodiments.

DETAILED DESCRIPTION

Figure 1:
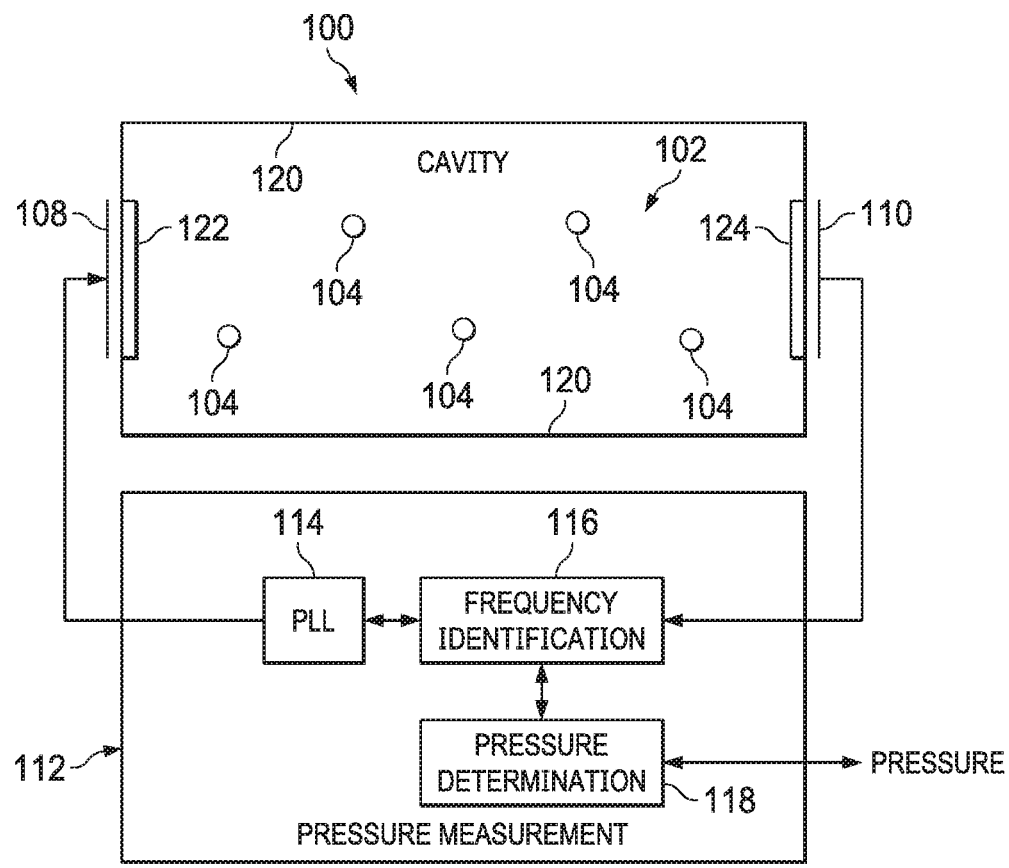
FIG. 1 shows a block diagram for a pressure transducer that measures pressure based on the width of the absorption peak of a dipolar molecule and/or frequency of a standing wave in a sealed cavity in accordance with various embodiments.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ."Also, the term "couple" or "couples" is intended to mean either an indirect or direct wired or wireless connection. Thus, if a first device couples to a second device, that connection may be through a direct connection or through an indirect connection via other devices and connections.

Conventional pressure measurement employs a variety of transducer technologies. Various pressure transducer technologies measure strain as an indicator pressure. Other transducer technologies measure particle density or thermal changes to determine pressure. Each conventional technology has its advantages and disadvantages. Generally, each of the technologies requires the addition of measurement apparatus to a system, and some of the technologies require that the apparatus have access to the pressurized media (e.g., access to the interior of pressure vessel). In many applications the addition of pressure measurement apparatus is undesirable or impossible. For example, the size and/or structure of a system may preclude the addition of pressure measurement apparatus.

Embodiments of the present disclosure include pressure measurement systems that allow for measurement of pressure in a sealed cavity without addition of discrete pressure sensors and associated measurement apparatus. The cavity may be constructed in a semiconductor substrate and be relatively small in size. For example, the cavity may be waveguide of a millimeter wave chip scale atomic clock constructed via a microelectromechanical system (MEMS) fabrication process. The waveguide contains selected dipolar molecules at a pressure chosen to optimize the amplitude of a signal absorption peak of the molecules detected at an output of the waveguide. Too much deviation from the chosen pressure may negatively affect the operation of the clock.

Embodiments of the present disclosure determine the pressure within the sealed cavity based on the signal output from the cavity. Various parameters of the signal are affected by the pressure within the cavity, and embodiments measure one or more of the parameters to determine the pressure. For example, the width of the absorption peak of the dipolar molecules is related to the pressure in the cavity. Increased pressure in the cavity results in an increase in the width of the absorption peak of the dipolar molecules. Some embodiments disclosed herein determine the pressure in the cavity by measuring the width of the absorption peak and correlating the width of the absorption peak to a pressure value. In another example, the frequency of a standing wave in the cavity changes with pressure. Some embodiments of the present disclosure determine the pressure in the cavity by identifying a frequency of the standing wave and correlating the frequency of the standing wave to a pressure value.

FIG. 1 shows a block diagram for a pressure transducer 100 that measures pressure based on the width of the absorption peak of a dipolar molecule in accordance with various embodiments. The pressure transducer 100 includes a cavity 102, molecules 104, transmit antenna 108, receive antenna 110, and pressure measurement circuitry 112. The cavity 102 is a sealed chamber or container. In some embodiments the cavity 102 is formed in a semiconductor substrate. The cavity 102 includes conductive interior surfaces 120 and non-conductive apertures 122 and 124. The cavity 102 with conductive interior surfaces 120 forms a waveguide. The non-conductive aperture 122 provides an electromagnetic field entrance to the cavity 102. The non-conductive aperture 124 provides an electromagnetic field exit from the cavity 102.

Figure 2:
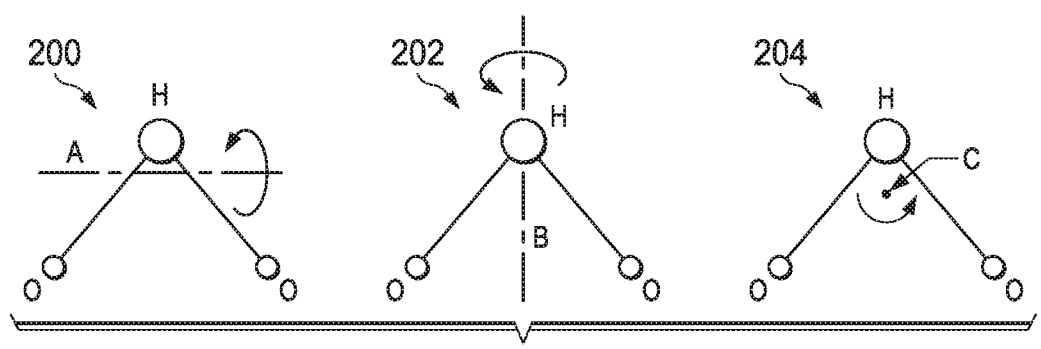
FIG. 2 shows three rotation modes of a dipolar molecule along three orthogonal axes.

The cavity 102 contains vapor molecules 104. The molecules 104 are dipolar molecules that have a set of very well defined quantum rotational state transition frequencies. In some embodiments, the dipolar molecules 104 have a rotational quantum transition that is unaffected by the pressure within the cavity 102. For example, as the pressure within the cavity 102 increases, the frequency of quantum rotational state transition of the dipolar molecules 104 remains constant. In some embodiments, the dipolar molecules 104 are water molecules. FIG. 2 includes illustrations 200, 202 and 204 respectively showing three rotational modes of a dipolar water molecule along three orthogonal axes. In some embodiments, the dipolar molecules 104 are molecules other than water that exhibit quantum rotational state transitions that are unaffected by pressure.

Figure 3:
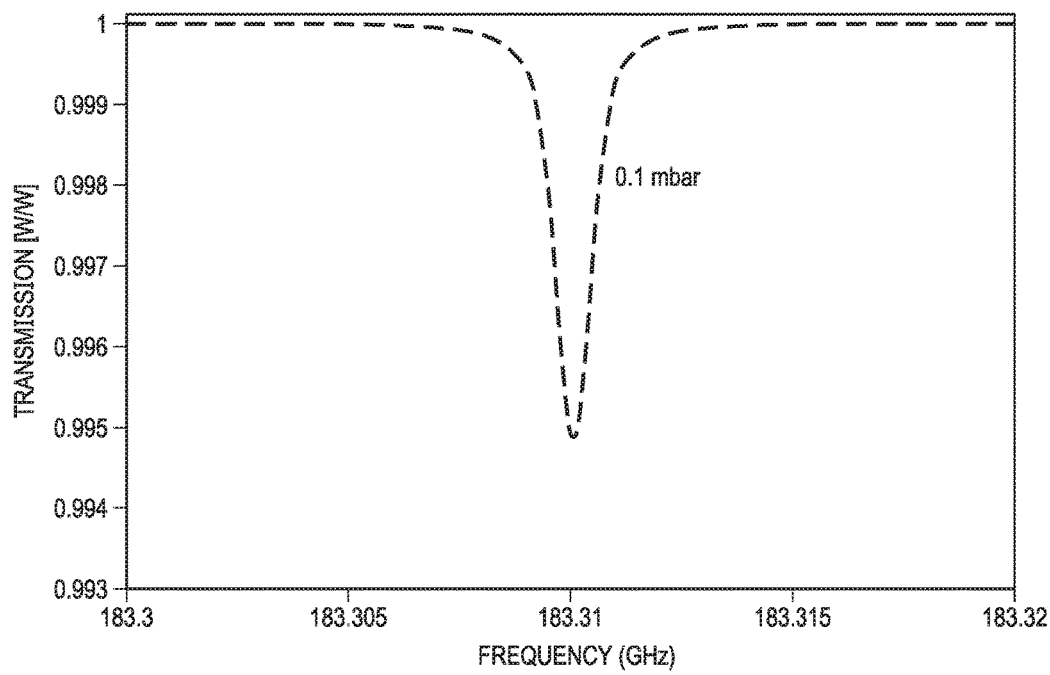
FIG. 3 shows an example of the absorption peak of a dipolar molecule in accordance with various embodiments.
Figure 4:
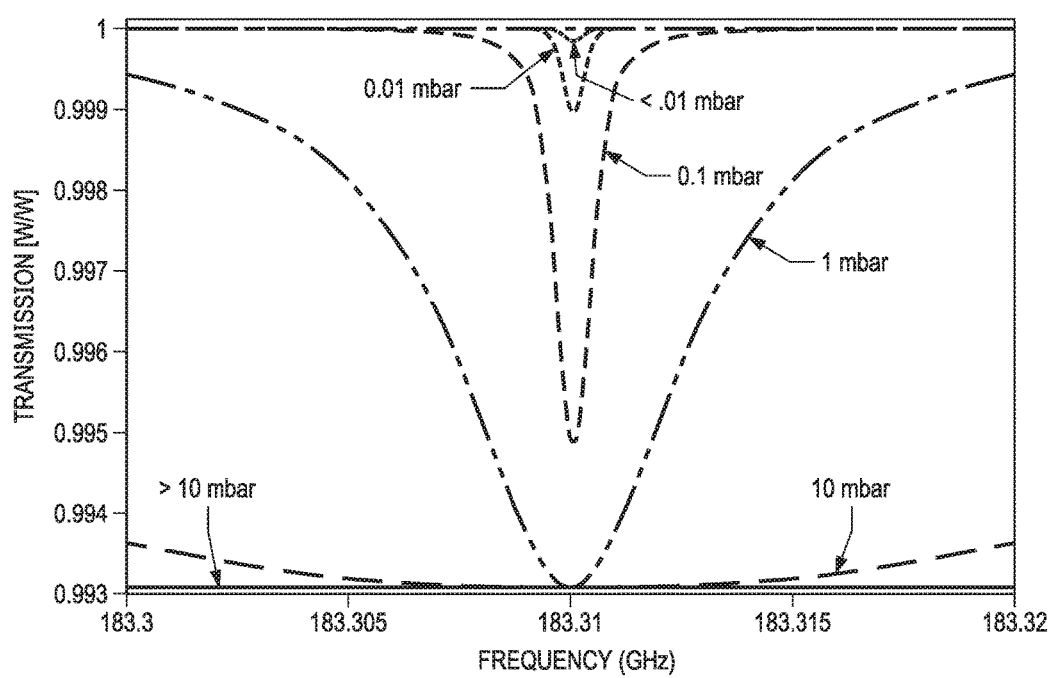
FIG. 4 shows an example of variation in pulse width at the absorption peak of a dipolar molecule caused by changes in pressure in accordance with various embodiments.

The transmit antenna 108 is disposed proximate the non-conductive aperture 122 to introduce signal into the cavity 102. The receive antenna 110 is disposed proximate the non-conductive aperture 124 to detect signal exiting the cavity 102. Each of the dipolar molecules 104 absorbs energy of the signal propagating through the cavity 102 at the molecule's frequency of quantum rotational state transition. Accordingly, embodiments determine the frequency of the quantum rotational state transition of the dipolar molecules 104 by monitoring the amplitude of the signal detected by the receive antenna 110. FIG. 3 shows an example of the change in detected signal amplitude about the frequency of quantum rotational state transition of the molecules 104 (where the molecules 104 are water molecules). FIG. 3 shows that the peak absorption of signal by the water molecules occurs at about 183.31 Giga-Hertz (GHz). The absorption peak of the dipolar molecules 104 illustrated in FIG. 3 is representative of the absorption peak of the dipolar molecules 104 at a specific cavity pressure (e.g., 0.1 mbar). As explained above, the quantum rotational state transition frequency, and in-turn the peak absorption frequency, of the dipolar molecules 104 does not vary with pressure. Accordingly, for any internal pressure of the cavity 102 the peak absorption frequency of water molecules 104 will be at 183.31 GHz. However, the width of the pulse at the frequency of the quantum rotational state transition of the dipolar molecules 104 varies with the pressure of the cavity 102. FIG. 4 shows a number of pulses at the peak absorption frequency of the dipolar molecules 104 where each of the pulses corresponds to a different pressure within the cavity 102. FIG. 4 shows that, above an optimal operational pressure, the width of the absorption peak increases with pressure. For example, as shown in FIG. 4, the width of the absorption peak is greater at a pressure of 10 millibars than at a pressure of 1 millibar. Similarly, the width of the absorption peak is greater at a pressure of 1 millibar than at a pressure of 0.1 millibars. Some embodiments determine the pressure within the cavity 102 at a given time based on the width of the absorption peak of the dipolar molecules 104 at the given time.

The pressure measurement circuitry 112 includes circuits that generate the signals driven into the cavity 102 and process the signals output from the cavity 102 to determine the pressure within the cavity 102. The pressure measurement circuitry 112 includes a phase locked loop (PLL) 114, frequency identification circuitry 116, and pressure determination circuitry 118. The PLL 114 is coupled to the transmit antenna 108. Some embodiments of the pressure measurement circuitry 112 include a driver circuit (not shown) to drive an output of the PLL 114 to the transmit antenna 108. The PLL 114 generates a range of frequencies (e.g., a sweep of frequencies) that include the frequency of peak absorption of the dipolar molecules 104. Thus, the frequency of the signal driven into the cavity 102, via the transmit antenna 108, varies with time and includes the frequency of peak absorption of the dipolar molecules 104. For example, if the pressure invariant frequency of peak absorption of the molecules 104 is F1, then the PLL 114 generates a frequency sweep having a start frequency that is less than F1 and an end frequency that is greater than F1.

The signal generated by the PLL 114 propagates through the cavity 102 to the receive antenna 110. The frequency identification circuitry 116 receives the signal detected by the receive antenna 110, and processes the received signal to determine the pressure invariant frequency of peak absorption of the molecules 104. For example, an embodiment of the frequency identification circuitry 116 includes a mixer that multiplies the received signal and the output of the PLL 114 and a low-pass filter that generates a DC signal from the output of the mixer, where the DC signal is representative of the amplitude of the signal received from the cavity 102 at the frequency generated by the PLL 114. Embodiments of the frequency identification circuitry 116 identify the frequency of peak absorption of the dipolar molecules 104 as a local minimum in the filter output. In some embodiments, the frequency identification circuitry 116 applies a different method of determining the amplitude of the signal received from the receive antenna 110. For example, some embodiments of the frequency identification circuitry 116 include an envelope detection circuit that generates a signal corresponding to the amplitude of the signal received from the receive antenna 110

The frequency identification circuitry 116 provides a signal corresponding to the absorption peak of the molecules 104 to the pressure determination circuitry 118. Some embodiments of the pressure determination circuitry 118 measure the width of the absorption peak to determine the pressure within the cavity 102. For example, an embodiment of the pressure determination circuitry 118 measures the width of the absorption peak at a given level above the minimum, where the given level is a predetermined voltage above the minimum, a percentage of the pulse amplitude above the minimum, etc. The width of the absorption peak is a range of frequencies between the leading and trailing edges of the absorption peak at the given level of the absorption peak. Embodiments of the pressure determination circuitry 118 measure the range of frequencies as time between the leading and trailing edges of the absorption peak at the given level, or measurement of another parameter indicative of the width of the absorption peak.

Some embodiments of the pressure determination circuitry 118 include a table of pressure values that relates pressure to the width of the absorption peak of the dipolar molecules 104. Such embodiments of the pressure determination circuitry 118 access the table based on the value of width of the absorption peak to retrieve a pressure value. Some embodiments of the pressure determination circuitry 118 compute a value of pressure based on the value of width of the absorption peak. For example, in some embodiments, pressure is a linear or non-linear function of width of the absorption peak and the pressure determination circuitry 118 evaluates the function at the value of width of the absorption peak to produce a value of pressure in the cavity 102. Some embodiments of the pressure determination circuitry 118 provide the value of pressure to circuitry external to the pressure transducer 100.

In some embodiments of the pressure measurement circuitry 112, the range of the sweep generated by the PLL 114 is extended to include the frequency of a standing wave in the cavity 102. The frequency of the standing wave is higher than the frequency of the absorption peak of the dipolar molecules 104. The frequency of the standing wave changes with the pressure in the cavity 102. FIG. 6 shows the amplitude of signal output of a sealed cavity over frequency at a variety of cavity pressures. The peak absorption frequency 602 of the dipolar molecules 104 is constant over pressure. However, the frequency of a standing wave in the cavity 102 varies with pressure. In FIG. 6, the signal amplitude peaks 604, 606, and 608 correspond to standing waves generated in the cavity 102 at pressures of 10 mbar, 100 mbar and 1000 mbar respectively. Embodiments of the frequency identification circuitry 116 identify the amplitude peaks (e.g., 604, 606, 608) as the frequencies of standing waves in the cavity 102. Some embodiments of the pressure determination circuitry 118 measure the frequency of the standing wave as a time or control value change between detection of the absorption peak 602 and detection of the signal amplitude peak 604, 606, or 608 corresponding to the standing wave, or measurement of another parameter indicative of the frequency of the standing wave.

Some embodiments of the pressure determination circuitry 118 include a table of pressure values that relates pressure to the frequency of a standing wave in the cavity 102. Such embodiments of the pressure determination circuitry 118 access the table based on the frequency of the standing wave to retrieve a pressure value. Some embodiments of the pressure determination circuitry 118 compute a value of pressure based on the frequency of the standing wave. For example, in some embodiments, pressure is a linear or non-linear function of the frequency of the standing wave and the pressure determination circuitry 118 evaluates the function at the value of frequency of the standing wave to produce a value of pressure in the cavity 102. Some embodiments of the pressure determination circuitry 118 provide the value of pressure to circuitry external to the pressure transducer 100.

FIG. 5 shows a flow diagram for a method 500 for measuring pressure based the width of the absorption peak of a dipolar molecule in accordance with various embodiments. Though depicted sequentially as a matter of convenience, at least some of the actions shown can be performed in a different order and/or performed in parallel. Additionally, some implementations may perform only some of the actions shown. In some implementations, at least some of the operations of the method 500 can be implemented by the transducer 100.

In block 502, the absorption peak of the dipolar molecules 104 is characterized over pressure. For example, in some embodiments, response of the dipolar molecules 104 in the cavity 102 is modeled to estimate the widths of the absorption peaks generated at various pressures within the cavity 102. In some embodiments, response of the dipolar molecules 104 in the cavity 102 is measured to determine the widths of the absorption peaks generated at various pressures within the cavity 102. The values of absorption peak width and associated pressure values are tabulated or provided as a function for use in determining pressure values based on the width of the absorption peak.

In block 504, a signal that includes a sweep of frequencies is generated. For example, the PLL 114 generates a sweep of frequencies. The range of frequencies included in the sweep include the frequency of the quantum rotational state transition of a dipolar molecule. The dipolar molecule may be the molecule 104. The frequency of the quantum rotational state transition of the dipolar molecule is pressure invariant, but the width of the absorption peak varies with pressure.

In block 506, the signal is driven into a sealed cavity that contains the dipolar molecule. For example, the signal is driven into the cavity 102 via the transmit antenna 108.

In block 508, the signal passes through the cavity and at a specific frequency causes a quantum rotational state transition in dipolar molecule. Circuitry external to the cavity receives the signal output from the cavity. For example, the receive antenna 110 detects the signal output of the cavity 102 and provides the detected signal to the pressure measurement circuitry 112.

In block 510, the frequency of peak absorption of the dipolar molecule is identified. The frequency of peak absorption of the dipolar molecule is the frequency of quantum rotational state transition of the dipolar molecule. Some embodiments determine the frequency of peak absorption of the dipolar molecule by multiplying the signal received from the cavity and the signal driven into the cavity. In such embodiments, the product is low-pass filtered to generate a DC signal that represents the amplitude of the signal received from the cavity 102 at the frequency of the signal driven into the cavity. The frequency of peak absorption is identified as a local minimum in the low-pass filtered signal.

In block 512, the pressure within the cavity is determined based on the width of the peak absorption (i.e., the width of the pulse at the identified minimum) of the dipolar molecule. The width of the absorption peak is determined. For example, the leading and trailing edges of the absorption peak are detected, and the range of frequencies spanned by the absorption peak is determined based on the difference in frequency at the leading and trailing edges. The width of the absorption peak is related to the pressure within the cavity. Accordingly, a value of the width of the absorption peak is employed to access a table (e.g., a table generated in block 502) that relates absorption peak width to pressure, or to evaluate a function (e.g., a function generated in block 502) that produces pressure based on absorption peak width.

FIG. 7 shows a flow diagram for a method 700 for measuring pressure based on the frequency of a standing wave in a sealed cavity in accordance with various embodiments. Though depicted sequentially as a matter of convenience, at least some of the actions shown can be performed in a different order and/or performed in parallel. Additionally, some implementations may perform only some of the actions shown. In some implementations, at least some of the operations of the method 700 can be implemented by the pressure transducer 100.

In block 702, the standing waves in the cavity 102 are characterized over pressure. For example, in some embodiments, response of the cavity 102 is modeled to estimate the frequencies of the standing waves generated at various pressures within the cavity 102. In some embodiments, the frequencies of the standing waves in the cavity 102 are measured at various pressures within the cavity 102. The established frequencies of the standing waves and associated pressure values are tabulated or provided as a function for use in determining pressure values based on the frequencies of the standing waves.

In block 704, a signal that includes a sweep of frequencies is generated. For example, the PLL 114 generates a sweep of frequencies. The range of frequencies included in the sweep include the frequency of quantum rotational state transition of a dipolar molecule disposed in the cavity 102 and frequencies of a standing wave in the cavity 102. The dipolar molecule may be the molecule 104. The frequency of quantum rotational state transition of the dipolar molecule is pressure invariant, but the frequency of a standing wave in the cavity 102 varies with pressure. Accordingly, the range of the sweep of frequencies encompasses the highest expected frequency of a standing wave in the cavity 102.

In block 706, the signal is driven into the sealed cavity 102 that contains the dipolar molecule. For example, the signal is driven into the cavity 102 via the transmit antenna 108.

In block 708, the signal passes through the cavity. At a specific frequency the signal causes the dipolar molecule to transition from one quantum rotational state to another quantum rotational state. At a frequency higher than the quantum rotation frequency of the dipolar molecule, a standing wave is generated in the cavity. Circuitry external to the cavity receives the signal output from the cavity. For example, the receive antenna 110 detects the signal output of the cavity 102 and provides the detected signal to the pressure measurement circuitry 112.

In block 710, the frequency of peak absorption of the dipolar molecule and the frequency of the standing wave are identified. The frequency of peak absorption of the dipolar molecule is the frequency of quantum rotational state transition of the dipolar molecule. Some embodiments determine the frequency of peak absorption of the dipolar molecule and the frequency of the standing wave in the cavity by multiplying the signal received from the cavity and the signal driven into the cavity. In such embodiments, the product is low-pass filtered to generate a DC signal that represents the amplitude of the signal received from the cavity at the frequency of the signal driven into the cavity. The frequency of peak absorption is identified as a local minimum in the low-pass filtered signal in a predetermined signal range. The frequency of the standing wave is identified as a maximum signal amplitude in the low pass filtered signal that is present in a predetermined range of frequencies higher than the frequency of peak absorption. (e.g., frequencies between the peak absorption frequency and the end frequency of the sweep).

In block 712, the pressure within the cavity is determined based on the frequency of the standing wave. The frequency of the standing wave is related to the pressure within the cavity. Accordingly, the frequency of the standing wave is employed to access a table that relates frequency to pressure, or to evaluate a function that produces pressure based on frequency.

FIG. 8 shows a block diagram for a clock generator 800 that includes pressure measurement based on the width of the absorption peak of a dipolar molecule and/or frequency of a standing wave in a sealed cavity in accordance with various embodiments. The clock generator 800 is a millimeter wave atomic clock that generates a reference frequency based on the frequency of quantum rotational state transition of a selected dipolar molecule contained in a hermetically sealed cavity 102 formed in semiconductor material. The reference frequency produced by the quantum rotational state transition of the selected dipolar molecules is unaffected by circuit aging and does not vary with temperature or other environmental factors. Various components of the clock generator 800 are similar to those of the pressure transducer 100, and such components are identified by use of the reference numerals employed in FIG. 1. The clock generator 800 monitors the pressure within the sealed cavity 102 to ensure that the necessary conditions for operation are maintained. At manufacture, the pressure with the cavity 102 is set to an optimal value for accurately generating the reference frequency. If the internal pressure of the cavity 102 deviates from the optimal value by more than a predetermined amount, the accuracy of the clock generator 800 may be reduced. Accordingly, embodiments of the clock generator 800 identify changes in internal pressure of the cavity 102 and provide pressure information to circuits external to the clock generator 800.

The clock generator 800 includes a cavity 102, molecules 104, a transmit antenna 108, a receive antenna 110, a PLL 114, frequency identification circuitry 116, clock generation circuitry 802, and pressure monitoring circuitry 804. The cavity 102 is a sealed chamber formed in a semiconductor substrate. In some embodiments, microelectromechanical system (MEMS) fabrication processes are used to construct the cavity 102. The cavity 102 includes conductive interior surfaces 120 and non-conductive apertures 122 and 124. The cavity 102 with conductive interior surfaces 120 forms a waveguide. The non-conductive aperture 122 provides an electromagnetic field entrance to the cavity 102. The non-conductive aperture 124 provides an electromagnetic field exit from the cavity 102.

The cavity 102 contains vapor molecules 104. The molecules 104 are dipolar molecules with specific and well defined quantum rotational states. The dipolar molecules 104 can transition between these quantum states by absorbing electromagnetic energy at the proper frequency. The frequency of these quantum transitions are unaffected by the pressure within the cavity 102. For example, as the pressure within the cavity 102 increases, the quantum rotational state transition frequency of the dipolar molecules 104 remains constant. In some embodiments, the dipolar molecules 104 are water molecules. In some embodiments, the dipolar molecules 104 are molecules other than water that exhibit a frequency of quantum rotational state transition that is unaffected by pressure.

The transmit antenna 108 is disposed proximate the non-conductive aperture 122 to introduce signal into the cavity 102. The receive antenna 110 is disposed proximate the non-conductive aperture 124 to detect signal exiting the cavity 102. The dipolar molecules 104 absorb energy of the signal propagating through the cavity 102 at the molecule's frequency of quantum rotational state transition. Accordingly, the amplitude of the signal received from the cavity 102 at the frequency of quantum rotational state transition of the molecules 104 will be reduced in amplitude relative to adjacent frequencies, and embodiments determine the frequency of quantum rotational state transition of the molecules 104 by monitoring the amplitude of the signal detected by the receive antenna 110. As explained above, the quantum rotational state transition frequency, and in-turn the peak absorption frequency, of the dipolar molecules 104 does not vary with pressure. Accordingly, for all internal pressures of the cavity 102 the peak absorption frequency of the dipolar molecules 104 will be constant. Embodiments determine the frequency of quantum rotational state transition of the dipolar molecules 104 by identifying the frequency of peak signal absorption by the dipolar molecules 104.

While the peak absorption frequency of the dipolar molecules 104 is pressure invariant, the width of the absorption peak is a function of pressure. Some embodiments of the clock generator 800 determine the pressure within the cavity 102 at a given time based on the width of the absorption peak of the dipolar molecules 104 at the given time.

The PLL 114 is coupled to the transmit antenna 108. In some embodiments, the pressure measurement circuitry 112 includes a driver circuit (not shown) to drive an output of the PLL 114 to the transmit antenna 108. The PLL 114 generates a range of frequencies (e.g., a sweep of frequencies) that include the frequency of peak absorption of the dipolar molecules 104. Thus, the frequency of the signal driven into the cavity 102, via the transmit antenna 108, varies with time and includes the frequency of peak absorption of the dipolar molecules 104. For example, if the dipolar molecules 104 are water molecules, then the PLL 114 generates a frequency sweep having a start frequency that is less than 183 GHz and an end frequency that is greater than 183 GHz. Generally, the range of frequencies in the sweep will be large enough to encompass the rising and falling edges of the absorption peak at a range of pressures.

The signal generated by the PLL 114 propagates through the cavity 102 to the receive antenna 110. The frequency identification circuitry 116 receives the signal detected by the receive antenna 110, and processes the received signal to determine the pressure invariant frequency of peak absorption of the molecules 104. For example, an embodiment of the frequency identification circuitry 116 includes a mixer that multiplies the received signal and the output of the PLL 114 and a low-pass filter that generates a DC signal from the output of the mixer, where the DC signal is representative of the amplitude of the signal received from the cavity 102 at the frequency generated by the PLL 114. Embodiments of the frequency identification circuitry 116 identify the frequency of peak absorption of the dipolar molecules 104 as a local minimum in the filter output. In some embodiments, the frequency identification circuitry 116 applies a different method of determining the amplitude of the signal received from the receive antenna 110. For example, some embodiments of the frequency identification circuitry 116 include an envelope detection circuit that generates a signal corresponding to the amplitude of the signal received from the receive antenna 110

The frequency identification circuitry 116 provides, to the pressure monitoring circuitry 804, a signal corresponding to the absorption peak of the molecules 104. Some embodiments of the pressure monitoring circuitry 804 measure the width of the absorption peak to determine the pressure within the cavity 102. For example, an embodiment of the pressure monitoring circuitry 804 measures the width of the absorption peak at a given level above the minimum, where the given level is a predetermined voltage above the minimum, a percentage of the pulse amplitude above the minimum, etc. The width of the absorption peak is range of frequencies between the leading and trailing edges of the absorption peak at the given level of the absorption peak. Embodiments of the pressure monitoring circuitry 804 measure the range of frequencies as time between the leading and trailing edges of the absorption peak at the given level, of measurement of another parameter indicative of the width of the absorption peak. In some embodiments, the pressure monitoring circuitry 804 is implemented as part of the frequency identification circuitry 116.

Some embodiments of the pressure monitoring circuitry 804 include a table of pressure values that relates pressure to the width of the absorption peak of the molecules 104. Such embodiments of the pressure monitoring circuitry 804 access the table based on the value of width of the absorption peak to retrieve a pressure value. Some embodiments of the pressure monitoring circuitry 804 compute a value of pressure based on the value of width of the absorption peak. For example, in some embodiments, pressure is a linear or non-linear function of width of the absorption peak and the pressure monitoring circuitry 804 evaluates the function at the value of width of the absorption peak to produce a value of pressure in the cavity 102.

In some embodiments of the clock generator 800, the range of the sweep generated by the PLL 114 is extended to include the frequency of a standing wave in the cavity 102. The frequency of the standing wave changes with the pressure in the cavity 102. Embodiments of the frequency identification circuitry 116 identify amplitude peaks in the low pass filter output signal at frequencies above the peak absorption frequency of the dipolar molecules 104 as the frequencies of standing waves in the cavity 102. Some embodiments of the pressure monitoring circuitry 804 measure the frequency of the standing wave as a time or control value change between detection of the absorption peak and detection of the signal amplitude peak corresponding to the standing wave, or measurement of another parameter indicative of the frequency of the standing wave.

Some embodiments of the pressure monitoring circuitry 804 include a table of pressure values that relates pressure to the frequency of a standing wave in the cavity 102. Such embodiments of the pressure monitoring circuitry 804 access the table based on the frequency of the standing wave to retrieve a pressure value. Some embodiments of the pressure monitoring circuitry 804 compute a value of pressure based on the frequency of the standing wave. For example, in some embodiments, pressure is a linear or non-linear function of the frequency of the standing wave and the pressure monitoring circuitry 804 evaluates the function at the value of frequency of the standing wave to produce a value of pressure in the cavity 102.

Some embodiments of the pressure monitoring circuitry 804 provide values of cavity pressure to circuits external to the clock generator 800. Given a value of pressure within the cavity 102, some embodiments of the pressure monitoring circuitry 804 compare the value of pressure to upper and/or lower limit values. If the value of pressure within the cavity 102 exceeds the upper limit value or is less than the lower limit value, then the pressure monitoring circuitry 804 transmits an alert signal to circuitry external to the clock generator 800 to notify the external circuitry of a change in cavity pressure that may affect operation of the clock generator 800.

The clock generation circuitry 802 is coupled to the frequency identification circuitry 116. The clock generation circuitry 802 produces an output clock signal having a frequency that is locked to the frequency of peak absorption of the dipolar molecules 104 (e.g., locked to the frequency that produces the identified minimum amplitude from the output of the cavity 102 in a narrow frequency range about the frequency of quantum rotational state transition of the dipolar molecules 104.) In some embodiments, the clock generation circuitry 802 includes an oscillator (e.g., a crystal oscillator) the frequency of which is adjusted based on the frequency of peak absorption of the dipolar molecules 104. For example, some embodiments of the clock generation circuitry 802 adjust the oscillator to cause the oscillator to produce an output frequency that is multiplied by the PLL 114 to produce the peak absorption frequency (i.e., the frequency of quantum rotational state transition) of the molecules 104. Thus, the output clock signal generated by the clock generation circuitry 802 is pressure and temperature invariant and locked to a frequency reference (e.g., the quantum rotational state transition frequency of the dipolar molecules 104) that does not change over time.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A pressure transducer, comprising:
   a cavity;
   dipolar molecules disposed within the cavity;
   pressure measurement circuitry configured to:
      measure a width of an absorption peak of the dipolar molecules; and
      determine a value of pressure in the cavity based on the width of the absorption peak.

2. The pressure transducer of claim 1, wherein the absorption peak is at a frequency of quantum rotational state transition of the dipolar molecules.

3. The pressure transducer of claim 1, further comprising:
   a first antenna coupled to the cavity, wherein the first antenna is configured to transmit signal into the cavity; and
   a second antenna coupled to the cavity, wherein the second antenna is configured to receive signal from the cavity.

4. The pressure transducer of claim 3, wherein the pressure measurement circuitry is coupled to the second antenna, the pressure measurement circuitry configured to determine a range of frequencies corresponding to the absorption peak.

5. The pressure transducer of claim 4, wherein the pressure measurement circuitry is configured to:
   detect a leading edge of the absorption peak;
   detect a trailing edge of the absorption peak;
   determine the range of frequencies based on a difference in frequency corresponding to the leading edge and frequency corresponding to the trailing edge.

6. The pressure transducer of claim 1, wherein the width of the absorption peak increases with pressure in the cavity.

7. The pressure transducer of claim 4, wherein the pressure measurement circuitry comprises:
   a phase-locked loop (PLL) configured to sweep a range of frequencies comprising the absorption peak; and
   frequency identification circuitry configured to determine amplitude of signal detected by the second antenna at a plurality of frequencies based on the frequencies swept by the PLL.

8. A method for measuring pressure in a cavity, comprising:
   transmitting a signal into the cavity, wherein the cavity contains dipolar molecules;
   measuring a width of an absorption peak of the dipolar molecules;
   determining a value of pressure in the cavity based on the width of the absorption peak.

9. The method of claim 8, wherein the absorption peak is at a frequency of quantum rotational state transition of the dipolar molecules.

10. The method of claim 8, further comprising:
    receiving signal output of from the cavity via a receive antenna coupled to the cavity;
    wherein the transmitting comprising driving a transmit antenna coupled to the cavity.

11. The method of claim 8, further comprising processing a signal output from the cavity to determine a range of frequencies corresponding to the absorption peak.

12. The method of claim 11, further comprising:
    detecting a leading edge of the absorption peak;
    detecting a trailing edge of the absorption peak; and
    determining the range of frequencies based on a difference in frequency corresponding to the leading edge and frequency corresponding to the trailing edge.

13. The method of claim 8, further comprising:
    generating a sweep of frequencies over a range that includes the absorption peak; and
    determining amplitude of signal received from the cavity at a plurality of frequencies based on the sweep of frequencies.

14. A pressure transducer, comprising:
    a cavity;
    dipolar molecules disposed within the cavity;
    pressure measurement circuitry configured to:
       identify a frequency of a standing wave in the cavity; and
       determine a value of pressure in the cavity based on the frequency of the standing wave.

15. The pressure transducer of claim 14, wherein the frequency of the standing wave is higher than a frequency of an absorption peak of the dipolar molecules.

16. The pressure transducer of claim 14, further comprising:
a first antenna coupled to the cavity, wherein the first antenna is configured to transmit signal into the cavity; and
a second antenna coupled to the cavity, wherein the second antenna is configured to receive signal from the cavity.

17. The pressure transducer of claim 16, wherein the pressure measurement circuitry is coupled to the second antenna, and the pressure measurement circuitry is configured to determine the frequency of the standing wave.

18. The pressure transducer of claim 17, wherein the pressure measurement circuitry is configured to:
detect the absorption peak;
detect a maximum signal amplitude following the absorption peak as corresponding to the frequency of the standing wave.

19. The pressure transducer of claim 14, wherein the pressure measurement circuitry comprises a table that relates pressure in the cavity to the frequency of the standing wave.

20. The pressure transducer of claim 14, wherein the pressure measurement circuitry comprises:
a phase-locked loop (PLL) configured to sweep a range of frequencies comprising the absorption peak and the frequency of the standing wave; and
frequency identification circuitry configured to determine amplitude of signal detected by the second antenna at a plurality of frequencies based on the frequencies swept by the PLL.

* * * * *